United States Patent [19]
Schweizer, Jr.

[11] 3,829,594
[45] Aug. 13, 1974

[54] PREPARATION OF NON-STICKY CHEESE RIBBONS

[75] Inventor: William P. Schweizer, Jr., Canton, Ohio

[73] Assignee: The Bonnot Co., Kent, Ohio

[22] Filed: June 8, 1973

[21] Appl. No.: 368,388

Related U.S. Application Data

[63] Continuation of Ser. No. 115,021, Feb. 12, 1971, abandoned.

[52] U.S. Cl.................... 426/516, 99/460, 426/361, 426/517, 426/518
[51] Int. Cl............................................ A23c 19/00
[58] Field of Search........... 426/518, 516, 519, 517, 426/361, 334, 465; 99/460, 466; 115/21; 425/202

[56] References Cited
UNITED STATES PATENTS

| | | | |
|---|---|---|---|
| 507,897 | 10/1893 | Ferry | 426/334 |
| 2,991,503 | 7/1961 | Rietz | 495/202 |
| 3,573,931 | 4/1971 | Dale | 426/465 |

Primary Examiner—David M. Naff
Attorney, Agent, or Firm—Gordon C. Mack

[57] ABSTRACT

Non-sticky ribbons of cheese for use in making processed cheese products are prepared by a process involving supplying 40 to 500 pound cheese blocks to conversion equipment wherein the blocks are divided into pieces by rotating knives followed by compressing the pieces with an auger and forcing the cheese through a screen with openings of about 0.015 to 0.375 inches in diameter using the minimum pressure required to force the cheese through the screen whereby the rise in the temperature of the cheese due to the compression thereof is no more than substantially 10°F.

1 Claim, 6 Drawing Figures

INVENTOR.
WILLIAM P. SCHWEIZER, JR
BY
ATTORNEY

PREPARATION OF NON-STICKY CHEESE RIBBONS

This application is a continuation of my application Ser. No. 115,021 filed Feb. 12, 1971 (now abandoned).

The invention relates to a continuous process of converting blocks of natural cheese into ribbons of very small cross sections without becoming sticky. The new ribbons are a part of the invention.

At the present time it is customary in the production of ribbons of natural cheese to cut blocks of the cheese into smaller pieces and feed these into a grinding device. Cutting the blocks is time-consuming, and the grinding device produces particles rather than ribbons. The ribbons of this invention are greatly preferred because they are much more readily blended with other cheeses and in producing processed cheeses the smaller ribbons are quickly heated.

Natural cheeses vary in composition from full fat cheeses to full skim cheeses. The latter type are relatively hard and brittle. The cheeses of the former type are softer and become sticky at a lower temperature than the full skim cheeses.

The cheese ribbons of this invention have many uses. A principal use is for blending and melting with other materials in the manufacture of processed cheese. The process is speeded up by the use of the fine ribbons of this invention and an intimate blend is obtained in a much shorter time than is now required, materially reducing the cost of the manufacture of the processed cheese.

In the apparatus of this invention all cheeses are readily processed, including full fat and full skim cheeses. It has heretofore been impossible to produce small ribbons of full skim cheese, and that is one of the advantages of this invention. Another advantage is that in the production of ribbons from full fat chesses the temperature must be kept low, and that is done in the apparatus of this invention; whereas in the other apparatus now on the market, even the production of small particles from full fat cheeses cannot be satisfactorily carried out because the cheeses become sticky and it would be impossible to make small ribbons because the heat generated causes the cheese particles to become too sticky. There are no ribbons of full fat cheese of small diameter on the market.

Natural cheeses are ordinarily handled in blocks of 40 pounds and in 500-pound barrels. Generally speaking, the invention relates to treating cheeses weighing about 40 or 500 pounds or any size intermediate these extremes.

I have found that in the chopping of full skim cheeses and its conversion to ribbons, a screw can be used for the smaller 40-pound blocks, but the larger 500-pound barrels must first be broken up, as by the knives, for efficient feeding to the extrusion auger. A chopper such as shown here is particularly valuable because it can be used on the smaller and the larger blocks of both full skim and full fat cheeses.

Natural cheeses are usually brought to the chopper from cold storage and usually have a temperature in the neighborhood of 40° to 55° F., but they may be at room temperature or thereabout when fed to the chopper.

In the conversion equipment of this invention, the cheeses are broken down into pieces most of which measure about 4 to 6 inches in all dimensions, and the pieces are extruded through a screen. The openings in the screen are usually 0.015 to 0.375 inch in the largest dimension, and the extruded cheese ribbons have this as their largest cross-sectional dimension, with a cross-sectional area, generally, of no more than about 0.11 square inches. The cross section may be square, rectangular, circular or oval, etc.

In the equipment of this invention, ribbons are formed without the cheese temperature rising more than 10° F. If the temperature of the cheese rises so that it becomes sticky, the ribbons adhere to one another and the advantage of forming the cheese into ribbons is lost. It is therefore advantageous, at least with full fat cheeses, to use a temperature as near as practical to the minimum temperature.

The invention is further illustrated in connection with the accompanying drawings, but the invention is not limited to the use of the equipment which is shown.

In the drawings

FIG. 6 is a horizontal sectional view through the cheese chopper.

Figure 1:
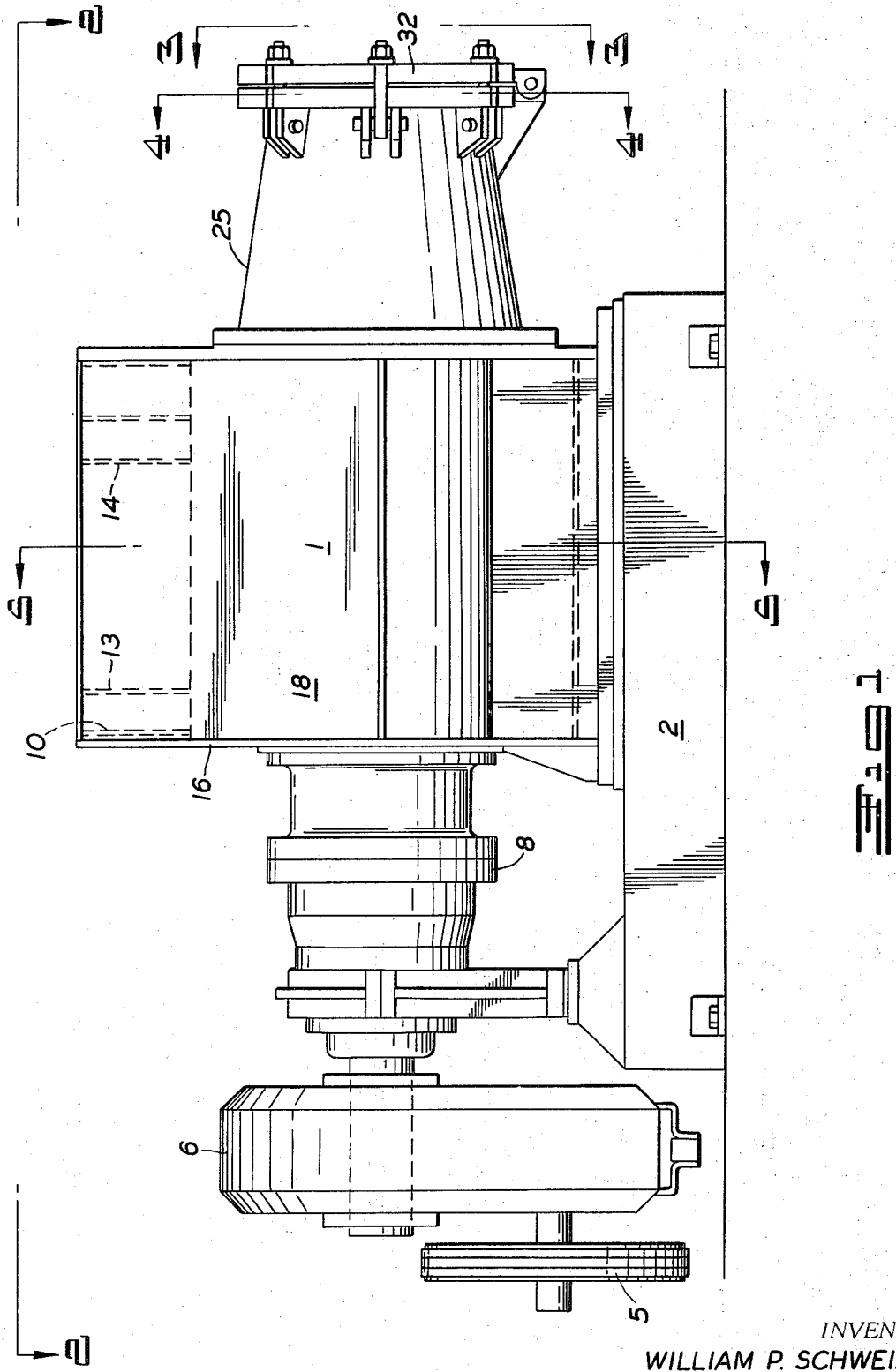
FIG. 1 is a side view of a cheese chopper.
Figure 2:
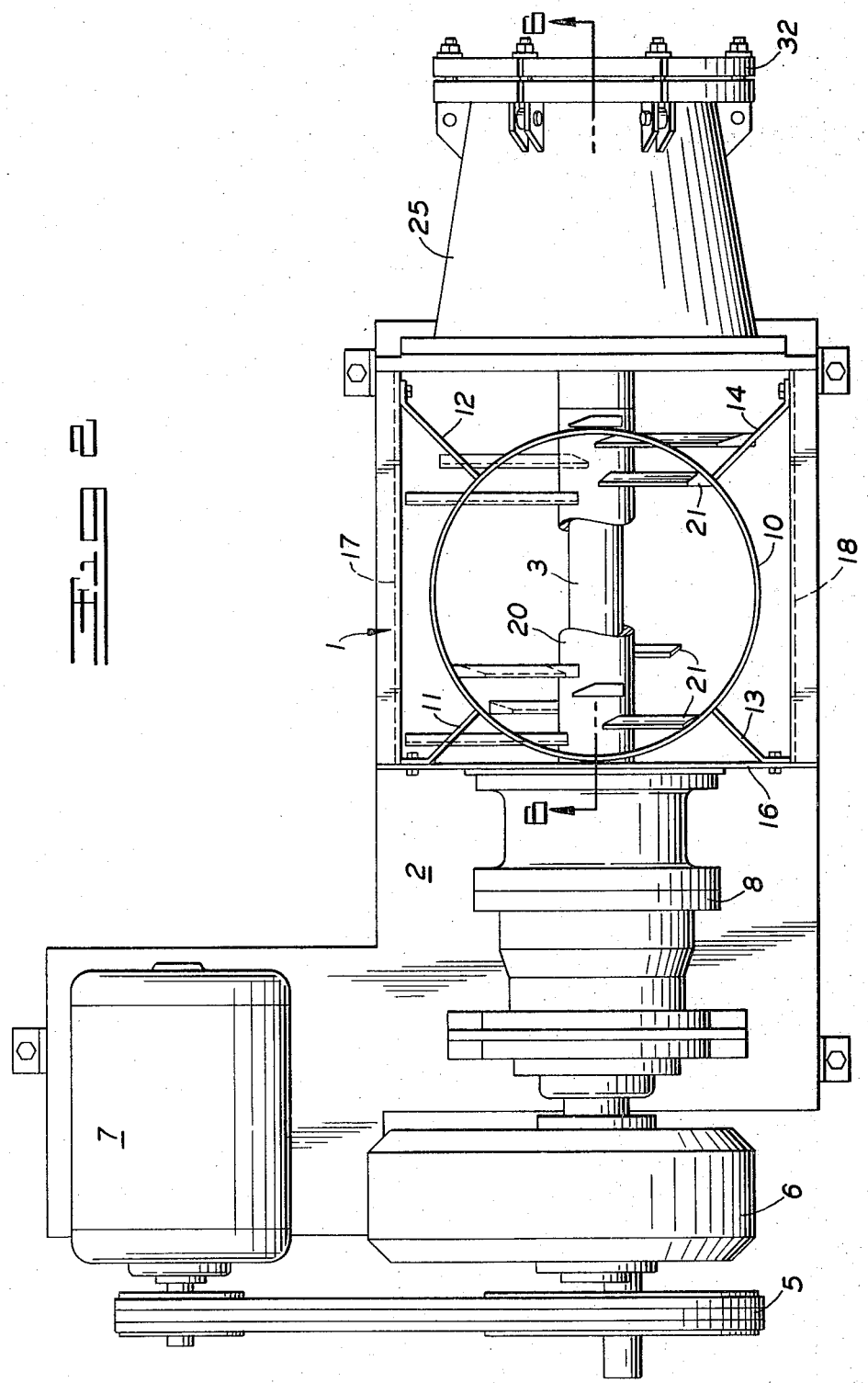
FIG. 2 is a top view of the same.
Figure 3:
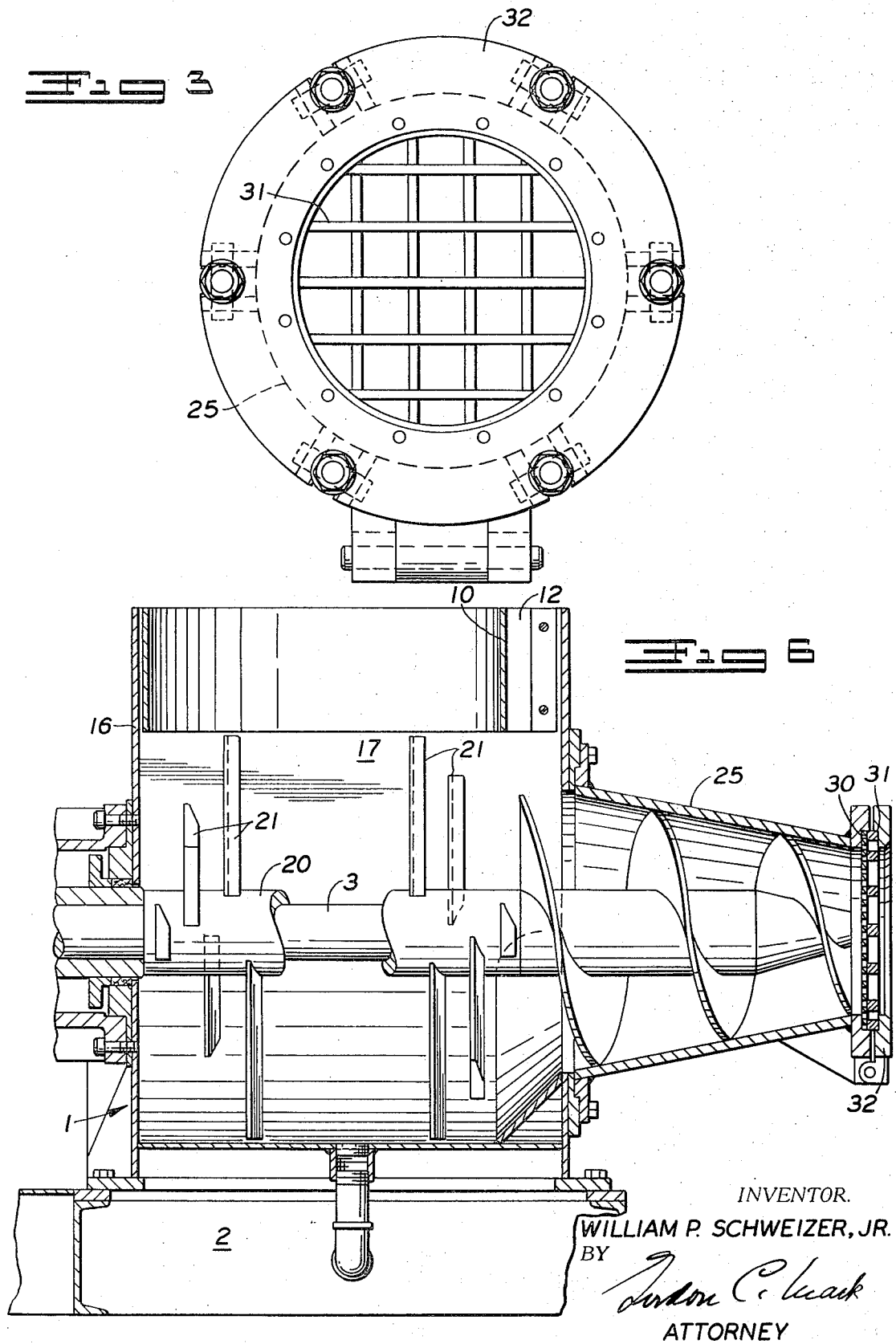
FIG. 3 is an end view of the same on the line 3—3 of FIG. 1.
Figure 5:
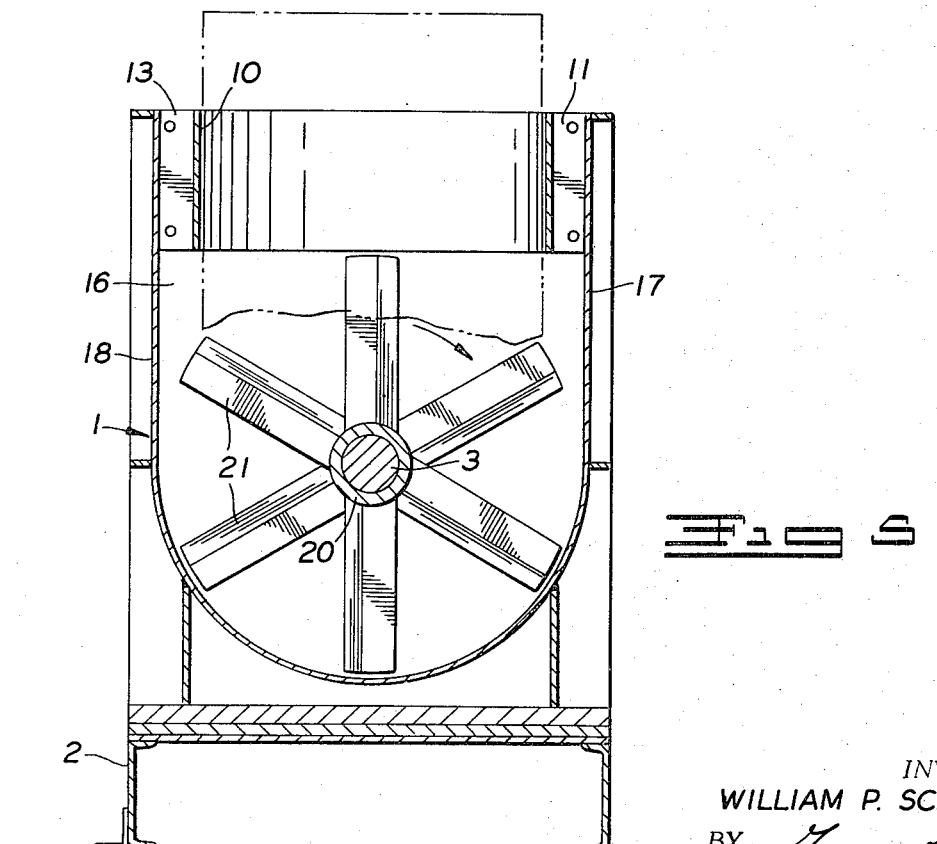
FIG. 5 is a vertical sectional view on the line 5—5 of FIG. 1.

The converter (FIGS. 2, 5 and 6 show a chopper) comprises a one-piece hopper 1, mounted on a support 2, with a drive shaft 3 driven from a motor (not shown) by belts 5 through the speed reducer 6 and the thrust-bearing assembly 8. The cheese is fed to the barrel through the hopper ring 10 fastened by braces 11, 12, 13 and 14 to the end wall 16 of the hopper and the housing walls 17 and 18.

The drawings show a tube 20 provided with knives 21 mounted over the drive shaft 3 and driven by the shaft. The knives are sharpened (as best shown in FIG. 5) and some extend within a short distance of the wall of the barrel (FIGS. 5 and 6). Others are shorter to provide efficient chopping of a cheese barrel.

Figure 4:
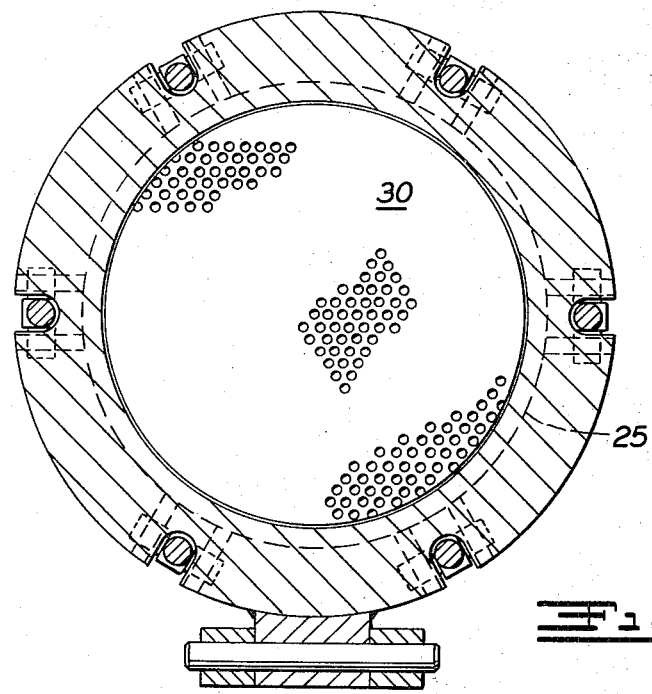
FIG. 4 is a vertical sectional view on the line 4—4 of FIG. 1.

In a chopper for a large cheese, the hopper may be about 30 inches long and 30 inches wide, with a hopper ring measuring about 25 inches across. There may be twenty-three knives, more or less, staggered around the tube 20 in a chopper of this size. The auger housing 25 may be about 20 inches long and taper from an inside diameter of about 20 inches to an inside diameter of about 12 inches, and be equipped with an auger with a 3:1 compression ratio to force the broken-up cheese through the screen 30 which fits behind the grid 31 in the door 32 which supports the screen. The holes in the screen are no greater than 0.375 inch in the largest dimension, and in FIG. 4 of the drawing the holes in the screen may, for instance, measure one-sixteenth, three-thirty-seconds or one-eighth inch in diameter for extrusion of any cheese which is fed to the chopper, which cheese weighs in the general range of 40 to 500 pounds, and with the auger turning 33 r.p.m., but the speed may vary from perhaps 15 to 50 r.p.m. If the pressure used to force the cheese through the screen is no more than substantially the minimum required, the temperature of the cheese as it passes through the holes will be only about 10° F. higher than the temperature at which the block is fed to the chopper. This small rise is not sufficient to convert a non-sticky cheese to an objectionally sticky cheese. The size of the holes has no appreciable effect on the pressure required for the extrusion or the temperature build-up within the cheese.

The length-to-diameter ratio and compression ratio of the auger may be varied somewhat without developing unnecessary pressure and producing excessive heat build-up.

The equipment will ordinarily be marketed in various sizes to meet the demands of the market.

I claim:

1. The method of treating cheese to produce cheese in non-sticky ribbons for use in making processed cheese products, which method consists essentially of, within a confined space within conversion equipment (1) supplying natural cheese blocks weighing substantially 40 to 500 pounds each and dividing the blocks into pieces by rotating knives against each block as it is fed into said space, (2) compressing the pieces by an auger within said space, (3) immediately at the outlet of the auger forcing the cheese from said space through a screen with openings measuring substantially 0.015 to 0.375 inches in the largest diameter to produce non-sticky cheese ribbons, said compressing and forcing from said space using substantially the minimum pressure required to force the cheese through the screen whereby the rise in the temperature of the cheese due to the compression thereof is no more than substantially 10° F. so that said cheese ribbons are nonsticky and (4) thereafter, without other treatment of said non-sticky ribbons, blending and melting said cheese ribbons with other materials.

* * * * *